United States Patent
Nomura et al.

(10) Patent No.: US 11,360,212 B2
(45) Date of Patent: Jun. 14, 2022

(54) ULTRASONIC TYPE OBJECT DETECTION APPARATUS

(71) Applicants: DENSO CORPORATION, Kariya (JP); TOYOTA JIDOSHA KABUSHIKI KAISHA, Toyota (JP)

(72) Inventors: Takuya Nomura, Kariya (JP); Mitsuyasu Matsuura, Kariya (JP); Taiki Yoshida, Kariya (JP); Motonari Ohbayashi, Kariya (JP); Hironobu Ishijima, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 15/515,541

(22) PCT Filed: Oct. 21, 2015

(86) PCT No.: PCT/JP2015/005298
§ 371 (c)(1),
(2) Date: Mar. 29, 2017

(87) PCT Pub. No.: WO2016/063527
PCT Pub. Date: Apr. 28, 2016

(65) Prior Publication Data
US 2017/0227640 A1 Aug. 10, 2017

(30) Foreign Application Priority Data
Oct. 22, 2014 (JP) .............................. JP2014-215718

(51) Int. Cl.
*G01S 15/00* (2020.01)
*G01S 15/93* (2020.01)
(Continued)

(52) U.S. Cl.
CPC .............. *G01S 15/93* (2013.01); *B60R 21/00* (2013.01); *G01S 7/524* (2013.01); *G01S 7/526* (2013.01);
(Continued)

(58) Field of Classification Search
None
See application file for complete search history.

(56) References Cited

U.S. PATENT DOCUMENTS 4,537,271 A * 8/1985 Ito ...................... B60K 31/0008
180/169
4,603,702 A * 8/1986 Hwang ................ A61B 5/6843
600/437
(Continued)

FOREIGN PATENT DOCUMENTS

CN 103241239 A * 8/2013
DE 102013204910 A1 9/2014
(Continued)

*Primary Examiner* — Isam A Alsomiri
*Assistant Examiner* — Jonathan D Armstrong
(74) *Attorney, Agent, or Firm* — Maschoff Brennan

(57) ABSTRACT

An ultrasonic type object detection apparatus sequentially detects a distance between an ultrasonic sensor and an object in a coverage of a transmission wave at a predetermined detection cycle based on a time taken for the ultrasonic sensor to transmit the transmission wave and then to receive a reflection wave. The apparatus includes: a storage storing the distance to the object; a vehicle information acquisition device acquiring vehicle information for calculating a movement distance; a detection distance predictor predicting a next detected distance to the object based on a past detection result and the vehicle information; and a short range determinator determining whether the object is present in a short
(Continued)

range area in which the distance between the object and the ultrasonic sensor is equal to or shorter than a short range threshold.

11 Claims, 5 Drawing Sheets

(51) Int. Cl.
  *B60R 21/00* (2006.01)
  *G01S 7/524* (2006.01)
  *G01S 7/526* (2006.01)
  *G01S 7/527* (2006.01)
  *G08G 1/16* (2006.01)
  *G01S 15/931* (2020.01)

(52) U.S. Cl.
  CPC ............ *G01S 7/527* (2013.01); *G01S 15/931* (2013.01); *G08G 1/16* (2013.01); *G08G 1/165* (2013.01); *G08G 1/166* (2013.01)

(56) References Cited

U.S. PATENT DOCUMENTS

| | | | | |
|---|---|---|---|---|
| 5,235,316 A * | 8/1993 | Qualizza | ............... | G01S 7/58 180/167 |
| 5,754,123 A * | 5/1998 | Nashif | ............... | B60Q 9/007 340/435 |
| 5,995,447 A * | 11/1999 | Mandal | ............... | G01V 1/44 181/106 |
| 6,002,639 A * | 12/1999 | Birchak | ............... | G01V 1/44 367/25 |
| 6,021,093 A * | 2/2000 | Birchak | ............... | G01V 1/44 181/105 |
| 6,125,079 A * | 9/2000 | Birchak | ............... | G01V 1/44 181/104 |
| 6,204,778 B1 * | 3/2001 | Bergan | ............... | G08G 1/075 340/905 |
| 6,269,161 B1 * | 7/2001 | McLaughlin | ......... | H04M 9/082 379/406.01 |
| 6,606,279 B1 * | 8/2003 | Preston | ............... | G01F 23/2961 367/908 |
| 8,024,102 B2 * | 9/2011 | Swoboda | ............ | B60K 31/0008 180/169 |
| 8,676,438 B2 * | 3/2014 | Yopp | ............... | G01N 29/32 374/1 |
| 9,896,073 B2 * | 2/2018 | Spencer | ............... | B60T 7/12 |
| 2003/0039171 A1 * | 2/2003 | Chiapetta | ............... | B62D 61/12 367/98 |
| 2003/0154792 A1 * | 8/2003 | Katayama | ............... | G01C 9/00 73/602 |
| 2005/0068197 A1 * | 3/2005 | Regan | ............... | G08G 1/16 340/932.2 |
| 2006/0092073 A1 | 5/2006 | Boecker et al. | | |
| 2006/0190175 A1 * | 8/2006 | Moriizumi | ............ | B60R 21/013 701/301 |
| 2007/0276571 A1 * | 11/2007 | Roudeau | ............ | F02D 41/1498 701/54 |
| 2008/0023254 A1 * | 1/2008 | Prost-Fin | ............... | B60K 35/00 180/400 |
| 2009/0009306 A1 * | 1/2009 | Magane | ................ | G01S 15/931 340/435 |
| 2009/0254260 A1 * | 10/2009 | Nix | ........................ | B60W 30/16 701/96 |
| 2010/0036565 A1 * | 2/2010 | Bernzen | ............... | B60R 21/013 701/45 |
| 2010/0071471 A1 * | 3/2010 | Matsumoto | ............. | G01S 7/527 73/627 |
| 2010/0246327 A1 * | 9/2010 | Yoshida | ............... | G01S 7/52003 367/103 |
| 2014/0148992 A1 * | 5/2014 | Shaffer | ................ | G01S 15/931 701/33.7 |
| 2014/0156157 A1 * | 6/2014 | Johnson | ................ | B60T 7/22 701/70 |
| 2014/0331772 A1 * | 11/2014 | Klotz | ...................... | G01S 7/527 73/602 |
| 2014/0355385 A1 * | 12/2014 | Inagaki | ............... | G01S 15/02 367/99 |
| 2016/0033628 A1 * | 2/2016 | Lee | ........................ | G01S 7/527 367/98 |
| 2016/0091606 A1 * | 3/2016 | Shin | ........................ | G01S 15/025 367/112 |
| 2016/0291153 A1 * | 10/2016 | Mossau | ................ | G01S 15/931 |
| 2016/0342181 A1 * | 11/2016 | Peterson | ................ | G05B 15/02 |
| 2017/0181727 A1 * | 6/2017 | Fukutani | .............. | A61B 5/0095 |
| 2017/0192423 A1 * | 7/2017 | Rust | ........................ | G05D 1/0038 |
| 2017/0193825 A1 * | 7/2017 | Schlechter | ............. | G08G 1/005 |
| 2017/0227640 A1 * | 8/2017 | Nomura | .................. | B60R 21/00 |
| 2017/0322304 A1 | 11/2017 | Matsuura et al. | | |
| 2018/0306889 A1 * | 10/2018 | Koga | ................... | G08G 1/0962 |
| 2019/0047465 A1 * | 2/2019 | Kim | ..................... | B60Q 1/1407 |
| 2019/0212443 A1 * | 7/2019 | Nomura | .................. | G01S 15/93 |

FOREIGN PATENT DOCUMENTS

| | | |
|---|---|---|
| JP | 3296804 B2 | 7/2002 |
| JP | 2009-143355 A | 7/2009 |
| JP | 2011-052963 A | 3/2011 |
| JP | 2013-196595 A | 9/2013 |
| JP | 2014-089077 A | 5/2014 |
| WO | WO-2004095056 A1 * 11/2004 | ............ G01S 5/18 |
| WO | WO-2014135342 A1 * 9/2014 | |

\* cited by examiner

ULTRASONIC TYPE OBJECT DETECTION APPARATUS

CROSS REFERENCE TO RELATED APPLICATION

This application is based on Japanese Patent Application No. 2014-215718 filed on Oct. 22, 2014, the disclosure of which is incorporated herein by reference.

TECHNICAL FIELD

The present disclosure relates to an ultrasonic type object detection apparatus that is used in a vehicle, and transmits/receives an ultrasonic wave to detect an object.

BACKGROUND ART

The ultrasonic type object detection apparatus periodically transmits an ultrasonic wave from an ultrasonic sensor on a predetermined cycle (detection cycle), and causes the ultrasonic sensor to receive a reflection wave reflected on an object (detection object) which is present in a coverage of the ultrasonic wave. Then, the ultrasonic type object detection apparatus determines a distance between the detection object and the ultrasonic sensor on the basis of a time from transmission of the ultrasonic wave to reception of the reflection wave. This type of ultrasonic type object detection apparatus is used in, for example, a vehicle to detect an object which is present in a vehicle travelling direction. The transmitted ultrasonic wave will be hereinafter referred to as transmission wave.

For a reception waveform obtained immediately after transmission of the transmission wave, the signal intensity is high due to the effect of the transmission wave (for example, on the same level as the transmission wave), and gradually attenuates with time. Such a phenomenon is called reverberation of the transmission wave. In general, reception of the reflection wave cannot be detected while reverberation has a predetermined signal intensity or higher.

As disclosed in Patent Literature 1, when the detection object is present in an area close to receive the reflection wave (referred to as short range area) while the transmission wave is being reverberated, and the reflection wave from the detection object is received, the reverberation waveform caused by transmission and the reflection waveform are totaled, apparently increasing a duration of the reverberation waveform.

Further, as disclosed in Patent Literature 1, a reference time during which a reception wave signal received with transmission of the transmission wave converges is set prior to determination whether the detection object is present. The reference time corresponds to duration of the reverberation waveform in the case where no detection object is present in the short range area (referred to as reverberation influence time). In determining whether the detection object is present, when the time required to allow the reception wave signal received with transmission of the transmission wave to converge is longer than the reference time, it is determined that the detection object is present in the short range area.

In Patent Literature 1, when the reverberation influence time measured to determine whether the detection object is present is longer than the predetermined reverberation influence time (that is, reference time), it is determined that the detection object is present in the short range area. However, even when an object is present in the short range area, the reverberation influence time may not become longer than the predetermined reverberation influence time. For example, in the case where the detection object is located so close that the reflection wave from the detection object converges to a predetermined threshold or less within the reverberation influence time, the reverberation influence time may not become longer.

A distance within which the reflection wave from the detection object converges to the predetermined threshold or less within the reverberation influence time is hereinafter referred to as closest approach distance, and an area where a distance between the ultrasonic sensor and the detection object in the short range area becomes the closest approach distance or less is hereinafter referred to as closest approach area.

In a case where the detection cycle is so short, the reverberation influence time can be observed while the vehicle gets closer to the detection object from the location where the detection object is sufficiently distant from the ultrasonic sensor, such that the distance between the ultrasonic sensor and the detection object becomes the closest approach distance or less. An increase in the reverberation influence time described herein means that the reverberation influence time measured to determine whether the detection object is present becomes longer than the predetermined reverberation influence time.

Then, once an increase in the reverberation influence time is detected, the determination result that the detection object is present in the short range area is held. With this configuration, even when an increase in the reverberation influence time cannot be detected later, it is recognized that the detection object is present in the short range area.

However, when the detection cycle is long relative to the approaching speed of the vehicle toward the detection object, the ultrasonic sensor may get close to the detection object until the distance between the ultrasonic sensor and the detection object becomes the closest approach distance or less, without detecting an increase in the reverberation influence time. In such a case, since an increase in the reverberation influence time cannot be detected, it cannot be determined that the detection object is present in the short range area.

PRIOR ART LITERATURES

Patent Literature

Patent Literature 1: JP 3296804 B2

SUMMARY OF INVENTION

The present disclosure aims to provide an ultrasonic type object detection apparatus capable of determining whether the detection object is present in the short range area even when an increase in the reverberation influence time cannot be detected.

According to an embodiment of the present disclosure, an ultrasonic type object detection apparatus is used in a vehicle for sequentially detecting a distance between an ultrasonic sensor and an object in a coverage of a transmission wave at a predetermined detection cycle, based on a time taken for the ultrasonic sensor to transmit the transmission wave and then to receive a reflection wave of the transmission wave. The apparatus includes: a storage that stores the detected distance between the object and the ultrasonic sensor; a vehicle information acquisition device that acquires vehicle information for calculating a movement distance of the vehicle based on previous detection of the distance between the ultrasonic sensor and the object and next detection of the distance between the ultrasonic sensor and the object; a detection distance predictor that predicts a next detected distance between the ultrasonic sensor and the object, based on a past detection result stored in the storage and the vehicle information; and a short range determinator that determines whether the object is present in a short range area in which the distance between the object and the ultrasonic sensor is equal to or shorter than a short range threshold, based on whether the predicted distance is equal to or shorter than the short range threshold. Furthermore, the short range threshold is an upper limit value of the distance within which the reflection wave from the object returns while the transmission wave is being reverberated in the ultrasonic sensor; and the predicted distance is a distance predicted by the detection distance predictor.

With this configuration, in determining whether the detection object is present in the short range area, an increase in the reverberation influence time need not be detected. For this reason, even when the detection cycle is long relative to the approaching speed of the vehicle toward the detection object, and periodic detection processing is executed at a timing when no increase in the reverberation influence time can be detected, it can be determined that the detection object is present in the short range area. That is, even when an increase in the reverberation influence time cannot be detected, it can be determined whether the detection object is present in the short range area.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
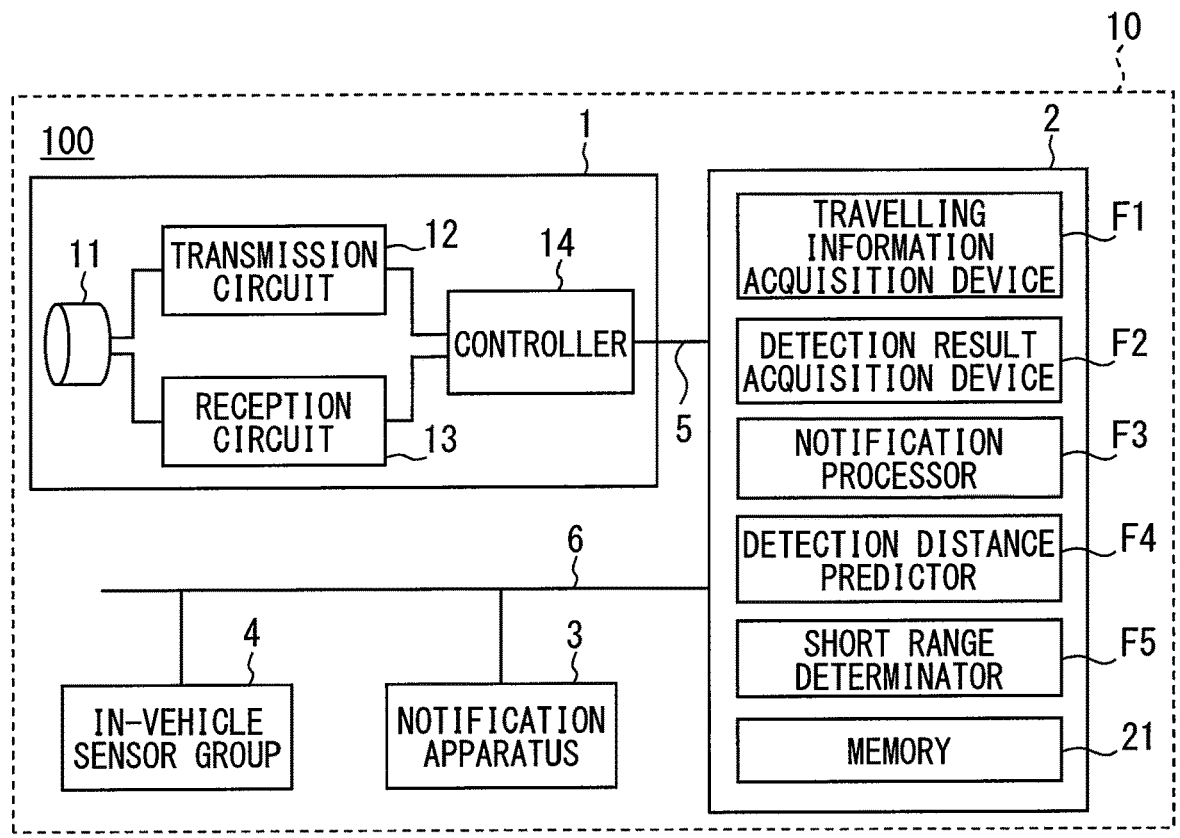
FIG. 1 is a view illustrating configuration of an object detection system.

An embodiment of the present disclosure will be described below with reference to the drawings. An object detection system 100 illustrated in FIG. 1 is mounted to a vehicle 10, and includes an ultrasonic sensor 1, a peripheral monitoring ECU 2, a notification apparatus 3, and an in-vehicle sensor group 4. The ultrasonic sensor 1 is communicably connected to the peripheral monitoring ECU 2 via a LIN bus 5. The peripheral monitoring ECU 2 is communicably connected to the notification apparatus 3 and the in-vehicle sensor group 4 via a well-known in-vehicle LAN 6. The vehicle 10 mounted to the object detection system 100 will be hereinafter referred to as a self-vehicle.

The notification apparatus 3 serves to notify the driver that the ultrasonic sensor 1 detects an object according to an instruction from the peripheral monitoring ECU 2. The notification apparatus 3 may be embodied as at least one of a well-known display apparatus, a speaker, and a vibration generator for generating vibrations (hereinafter referred to as vibrator).

For example, when the notification apparatus 3 visually notifies the driver, the notification apparatus 3 causes an image (including a text) based on an instruction from the peripheral monitoring ECU 2 to be displayed on the display apparatus to notify the driver of detection of the object. As a matter of course, the visual notification of the driver may be made using an indicator such as an LED. When the notification apparatus 3 audibly notifies the driver, the notification apparatus 3 outputs a predetermined sound (including only an alarm) to notify detection of the object. When the notification apparatus 3 tactually notifies the driver, the notification apparatus 3 causes the vibrator to vibrate in a predetermined vibration pattern, thereby notifying the driver of detection of the object. The vibrator may be provided on any place contact with the driver, such as a driver's seat or a steering wheel.

The in-vehicle sensor group 4 is a group of sensors for detecting various state amounts about travelling of the self-vehicle 10. Examples of the in-vehicle sensor group 4 include a vehicle speed sensor, an acceleration sensor, a gyrosensor, a GNSS receiver, a steering angle sensor, and a shift position sensor.

The vehicle speed sensor detects the travelling speed of the self-vehicle 10, and the acceleration sensor detects the acceleration of the self-vehicle 10 in the front-back direction. In the acceleration described herein, any positive value represents an increase in vehicle speed. That is, any negative value represents a decrease in vehicle speed.

The GNSS (Global Navigation Satellite System) receiver receives radio waves from a satellite in a GNSS to acquire positional information (attitude and latitude) indicating the current position of the GNSS receiver. As a matter of course, the GNSS receiver may be a GPS receiver. The gyrosensor detects rotational angle speed about the vertical axis of the self-vehicle 10, and the steering angle sensor detects the steering angle based on the steering turning angle. The shift position sensor detects the position of a shift lever.

The various state amounts detected using the sensors in the in-vehicle sensor group 4 (hereinafter referred as vehicle information) are successively (for example, every 100 milliseconds) outputted to the peripheral monitoring ECU 2. The in-vehicle sensor group 4 does not necessarily include all of the above-mentioned sensors. The sensors in the in-vehicle sensor group 4 are not limited to the above-mentioned sensors. As illustrated in FIG. 1, the ultrasonic sensor 1 includes a transmission/reception element 11, a transmission circuit 12, a reception circuit 13, and a controller 14. Although FIG. 1 illustrates only one ultrasonic sensor 1 for convenience, the object detection system 100 may include a plurality of ultrasonic sensors 1.

As an example, in the present embodiment, there are provided four ultrasonic sensors 1 (hereinafter referred as front sensor) for detecting an object that is present in front of the self-vehicle 10, and four ultrasonic sensors 1 for detecting an object that is present in rear of the self-vehicle 10. The front sensor may be arranged to form a desired detection area in a front bumper. The rear sensor may be arranged to form a desired detection area in a rear bumper. Any ultrasonic sensor has the same configuration as the ultrasonic sensor 1 described herein.

The transmission/reception element 11 transmits the ultrasonic wave, and receives the reflection wave generated by reflection of the transmitted ultrasonic wave (hereinafter referred as transmission wave) on an external object. The transmission/reception element 11 as one oscillation element has both of the transmission function and the reception function.

The transmission circuit 12 pulse-modulates a sinusoidal wave of a predetermined frequency in an ultrasonic wave area to generate a pulse signal. Based on the pulse signal, the transmission/reception element 11 periodically outputs the ultrasonic wave. The cycle on which the ultrasonic wave is outputted (hereinafter referred as detection cycle) is a few hundreds of milliseconds, for example. The reception circuit 13 amplifies and A/D converts a signal generated in the transmission/reception element 11 (hereinafter referred as reception signal), and outputs the signal to the controller 14.

Figure 2:
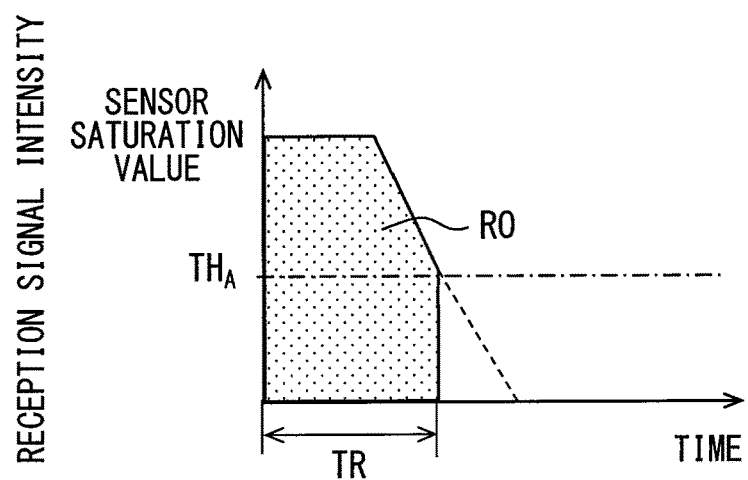
FIG. 2 is a conceptual view for describing reverberation influence time.

After stopping outputting of the pulse signal, the transmission/reception element 11 continues vibration for a certain time. The vibration continuing after stopping of the pulse signal is reverberation. The reverberation gradually attenuates. FIG. 2 is a conceptual view illustrating the reception signal received by the reception circuit 13 in the process in which the transmission wave starts to be transmitted and reverberation gradually attenuates.

The reverberation influence time TR illustrated in FIG. 2 represents the time taken for the signal intensity of the reception signal (hereinafter referred as reception signal intensity) to fall below an intensity threshold $TH_A$ from start of transmission of the transmission wave. The reverberation influence time TR is a sum of an output time of the ultrasonic wave corresponding to the pulse signal, and a time taken for reverberation converges to the intensity threshold $TH_A$ or less (hereinafter referred as reverberation convergence time).

The reverberation influence time TR depends on hardware including the transmission/reception element 11, the output level of the transmission wave, and the intensity threshold $TH_A$. The reverberation influence time TR may be previously set according to various tests for measuring the reverberation influence time TR, simulation, and so on. A reverberation wave R0 illustrated in FIG. 2 indicates a reception signal corresponding to the transmission wave, and a portion of reverberation caused by the transmission wave, having the intensity threshold $TH_A$ or higher.

The controller 14 outputs an instruction signal that instructs the transmission circuit 12 to generate a pulse signal. Then, the controller 14 acquires the reception signal from the reception circuit 13, and detects the reflection wave on the basis of the acquired reception signal.

The reflection wave can be detected when the reverberation influence time TR has passed since transmission of the transmission wave (see FIG. 2). When the reception signal intensity exceeds the intensity threshold $TH_A$ after termination of the reverberation influence time TR, the controller 14 determines that the reflection wave is received from the object (hereinafter referred as detection object). Then, a distance to the detection object is calculated by multiplying a half of flight time (TOF: Time of Flight) from transmission of the transmission wave to reception of the reflection wave by sound speed.

Although the intensity threshold $TH_A$ used to determine the reverberation influence time TR is set to be equal to the intensity threshold $TH_A$ used to detect the reflection wave in the present embodiment, the value may be different. The distance calculated by the controller 14 of the ultrasonic sensor 1 is defined as a detection distance D.

When the transmission wave is multiply reflected on the same object, or is reflected on detection objects located at different positions, a plurality of reflection waves may be detected for one transmission wave. When a plurality of reflection waves are detected for one transmission, the controller 14 calculates the detection distance D for each of the reflection waves.

In the case where the reflection waves detected at plural times for one transmission need to be distinguished from each other, the reflection wave first detected from transmission of the transmission wave will be hereinafter referred to as a first reflection wave, and the reflection wave detected next will be hereinafter referred to as a second reflection wave. Only the reflection wave refers to the first reflection wave, and only the detection distance D refers to the detection distance D corresponding to the first reflection wave.

The controller 14 outputs detection result data including the detection distance D to the peripheral monitoring ECU 2. The detection result data described herein includes the detection distance D as well as the time when the reflection wave exceeds the intensity threshold $TH_A$, the time when the reflection wave falls below the intensity threshold $TH_A$, and peak value. The peak value is a maximum value of a period during which the reflection wave exceeds the intensity threshold $TH_A$, and falls below the intensity threshold $TH_A$.

The detection result data corresponds to one transmission wave. In the case where a plurality of reflection waves are received for one transmission, the data includes the above-mentioned information items on each of the reflection waves. For example, in the detection result data, the information items on the reflection waves may be arranged in the order of detection of the reflection waves.

A series of processing of the controller 14 from outputting of the transmission wave to feeding of the detection result data to the peripheral monitoring ECU 2 will be hereinafter referred to as detection processing. The detection processing may be periodically executed on the above-mentioned detection cycle, while a control signal to execute the detection processing is being inputted from the peripheral monitoring ECU 2.

The peripheral monitoring ECU 2 is a well-known circuit including a CPU, a ROM, a RAM, an input/output interface, and a memory 21. The CPU runs a program stored in the ROM or the memory 21, enabling the peripheral monitoring ECU 2 to function as a vehicle information acquisition device F1, a detection result acquisition device F2, a notification processor F3, a detection distance predictor F4, and a short range determinator F5. Any or all of the functions performed by the peripheral monitoring ECU 2 may be embodied using one or more ICs in a hardware manner. The peripheral monitoring ECU 2 corresponds to an ultrasonic type object detection apparatus.

The memory 21 may be embodied as a well-known rewritable storage medium. In the case where the program performed by the CPU is stored in the memory 21, the memory 21 includes at least a nonvolatile storage area for storing the program. The memory 21 corresponds to a storage.

The vehicle information acquisition device F1 acquires vehicle information from the in-vehicle sensor group 4. The vehicle information obtained by the vehicle information acquisition device F1 is stored in the memory 21. The memory 21 can be referred to by the other functional units.

Each of the functional units can execute processing using the vehicle information stored in the memory 21 as necessary.

The vehicle information acquisition device F1 identifies the travelling direction of the self-vehicle 10 on the basis of the obtained vehicle information. For example, the travelling direction of the self-vehicle 10 may be determined on the basis of a detection result of the shift position sensor, or the rotating direction of wheels. More specifically, when the shift position is located at a forward position where a driving force is applied to move the self-vehicle 10 forward, the travelling direction is determined as a forward direction. When the shift position is located at a backward position when a driving force is applied to move the self-vehicle 10 backward, the travelling direction is determined as a backward direction.

The detection result acquisition device F2 sequentially acquires the detection result data from the ultrasonic sensor 1. The detection result data is stored in the memory 21 in the order of acquisition. For example, the detection result acquisition device F2 provides the detection result data with information (time stamp) indicating the acquisition time (or acquisition order), and stores the detection result data in the memory 21 on a time-series basis.

The notification processor F3 determines whether the detection object is present in a predetermined notification area, on the basis of the detection result of the ultrasonic sensor 1. When the detection object is present in the notification area, the notification processor F3 causes the notification apparatus 3 to notify the fact that the detection object is present in the notification area. The notification area may be appropriately designed for the coverage (hereinafter referred as detection area) of the transmission wave of the ultrasonic sensor 1. The notification area includes at least an area within a below-mentioned short range threshold Dth1 from the ultrasonic sensor 1 in the detection area. The processing executed by the notification processor F3 is defined as notification processing. The detection distance predictor F4 and the short range determinator F5 will be described below with reference to FIG. 3 and subsequent figures.

The peripheral monitoring ECU 2 executes various kinds of processing. For example, the peripheral monitoring ECU 2 determines whether the vehicle speed falls within a predetermined operating vehicle speed area on the basis of the vehicle information obtained by the vehicle information acquisition device F1. The peripheral monitoring ECU 2 outputs a control signal to instruct the ultrasonic sensor 1 to sequentially execute the detection processing while the vehicle speed falls within the operating vehicle speed area. The operating vehicle speed area is 40 km/h or less, for example.

As described above, the peripheral monitoring ECU 2 executes various kinds of processing. The processing may be executed by a single CPU according to a well-known task scheduling algorithm, or may be executed by a plurality of CPUs in parallel.

Next, short range determination processing executed by the peripheral monitoring ECU 2 will be described with reference to a flowchart in FIG. 3. The short range determination processing is processing of determining whether the detection object present in the travelling direction of the self-vehicle 10 is present in such a short range to receive a first reflection wave R1 under reverberation. Hereinafter, an area from the ultrasonic sensor 1, in which the first reflection wave R1 returns from the detection object under reverberation of the transmission wave, will be referred to as short range area. The short range area is an area of 30 cm to 50 cm at most from the ultrasonic sensor 1.

The short range determination processing is executed on the basis of the detection result data from the ultrasonic sensor 1 that forms the detection area present in the travelling direction of the self-vehicle 10. The reason is as follows: the detection object that is present in the direction away from the self-vehicle 10 is likely to move further from the vehicle 10 with travelling of the vehicle and thus, the usefulness of the below-mentioned short range determination processing is relatively low.

As a matter of course, from another aspect, the ultrasonic sensor 1 that forms the detection area present in any direction other than the travelling direction of the self-vehicle 10 may be subject to the processed. In the case of a plurality of ultrasonic sensors 1 that forms the detection area present in the travelling direction of the self-vehicle 10, the below-described short range determination processing may be executed for the detection result data of each of the ultrasonic sensors 1.

Figure 3:
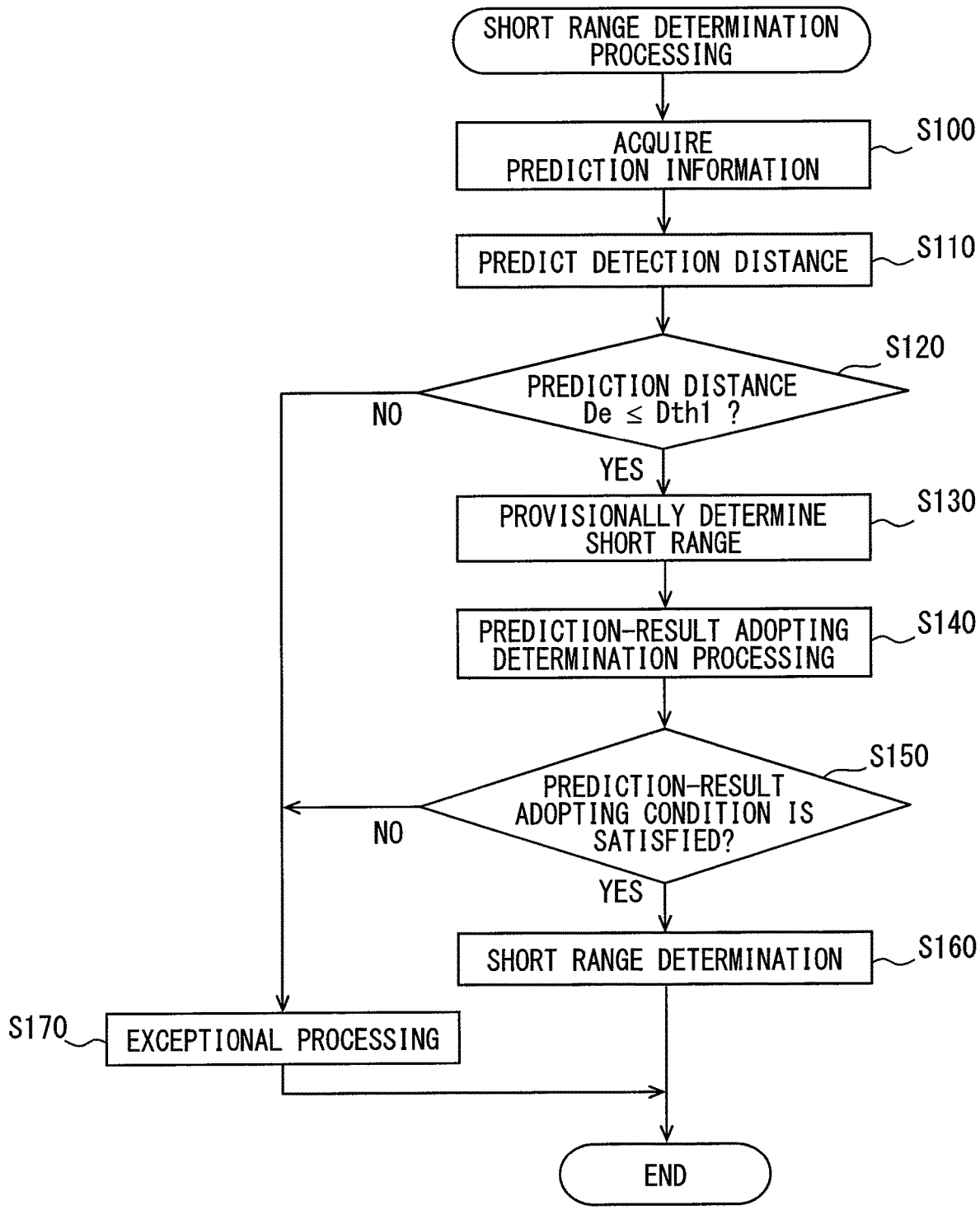
FIG. 3 is a flowchart for describing short range determination processing executed by a peripheral monitoring ECU in accordance with the present embodiment.

The short range determination processing illustrated in FIG. 3 may be executed each time the detection result acquisition device F2 acquires the detection result data from the ultrasonic sensor 1 to be processed during turning-on of an ignition switch.

From another aspect, in the case where the object detection system 100 combines detection results of the plurality of ultrasonic sensors 1 with each other to identify the position (distance and direction) of the detection object relative to the self-vehicle 10, the short range determination processing may be executed for each detected object. In such a case, when the detection processing in all of the ultrasonic sensors 1 that form the detection area in the travelling direction of the self-vehicle 10 is completed, the short range determination processing may be executed.

The detection distance predictor F4 acquires predicting information in Step S100, and the procedure proceeds to Step S110. The predicting information described herein is information used to predict the detection distance D to be detected in next detection processing. More specifically, the detection distance predictor F4 accesses the memory 21, and acquires detection result data acquired last from the ultrasonic sensor 1, and vehicle speed and acceleration at the previous detection processing.

The past detection result data read here is not limited to the last data, and may be past data some times ago. In the present embodiment, it is assumed that the acceleration is constant while the ultrasonic sensor 1 transmits one transmission wave last and transmits next transmission wave, to obtain vehicle speed and acceleration at last acquisition of the detection result data from the ultrasonic sensor 1 as the predicting information. However, the present invention is not limited to this case.

The moving distance of the self-vehicle 10 for a period from last detection processing to next detection processing, that is, a certain period (here, detection cycle) can be calculated according to any suitable well-known method. Information for calculating the movement distance may be information corresponding to the adopted method. The illustrated method of calculating the movement distance is merely an example.

For example, from another aspect, when the detection cycle is so long as to obtain vehicle information multiple times in one detection cycle, vehicle speed and acceleration at plural times may be obtained. More specifically, vehicle speed and acceleration may be obtained at last detection processing and subsequent detection processing. Alternatively, the latest vehicle speed and acceleration, rather than vehicle speed and acceleration at the last detection processing, may be obtained. Further, positional information or rotational angle of wheels, rather than vehicle speed and acceleration, may be used.

In Step S110, the detection distance predictor F4 predicts the movement distance of the self-vehicle 10 from last detection processing to next detection processing, on the basis of the detection cycle, and vehicle speed and acceleration obtained in Step S100. For example, a movement distance Dm is calculated by adding a value found by multiplying the acceleration by the square of the detection cycle and dividing the found value by 2, to a value found by multiplying the vehicle speed at last detection processing by the detection cycle.

Then, the distance detected in next detection processing is calculated by subtracting the movement distance Dm from last detection distance D. The distance calculated by the detection distance predictor F4 is defined as a predicted distance De. When processing in Step S110 is completed, the procedure proceeds to Step S120.

In Step S120, the short range determinator F5 determines whether the predicted distance De is equal to or smaller than the predetermined short range threshold Dth1. The short range threshold Dth1 is a distance within which the reflection wave reflected on the detection object (original first reflection wave) R1 returns to the ultrasonic sensor 1 within the reverberation influence time TR. That is, the short range threshold Dth1 is an upper limit value of the distance within which the ultrasonic wave reciprocates between the ultrasonic sensor 1 and the detection object within the reverberation influence time TR. Therefore, the short range threshold Dth1 is a distance found by multiplying the reverberation influence time TR by the sound speed and dividing the found value by 2. The above-mentioned short range area corresponds to an area within the short range threshold Dth1 from the ultrasonic sensor 1.

Figure 4:
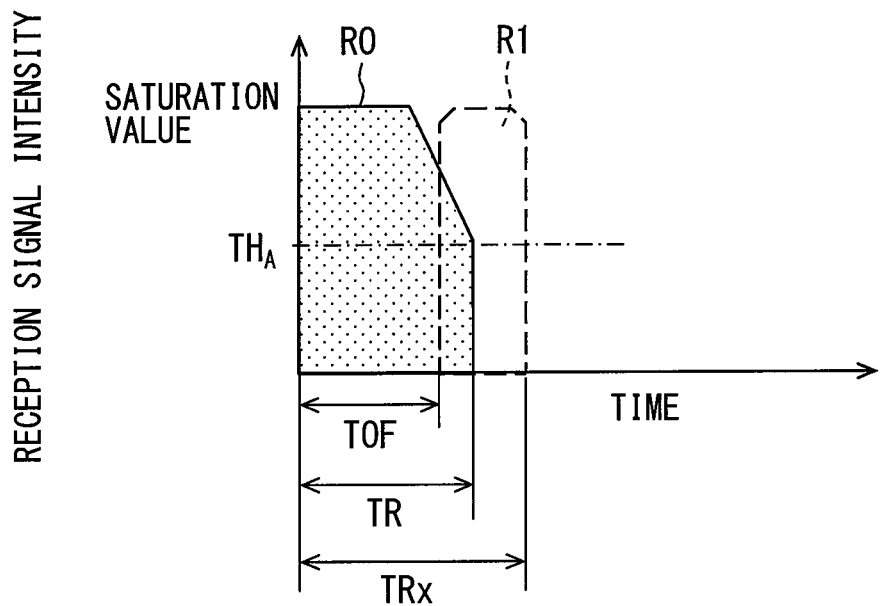
FIG. 4 is a conceptual view illustrating the state where a first reflection wave is combined with a reverberation wave.
Figure 5:
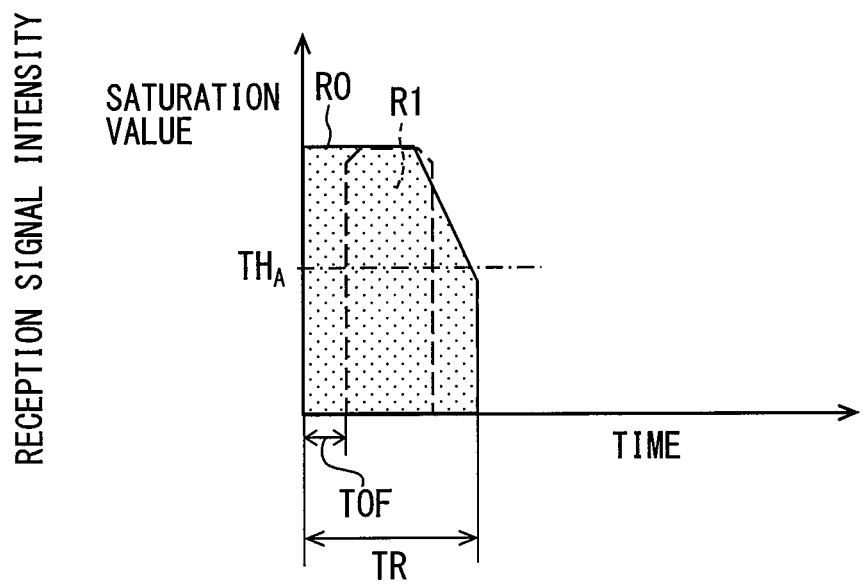
FIG. 5 is a conceptual view illustrating the state where the first reflection wave is embedded in the reverberation wave.

Here, FIG. 4 and FIG. 5 are conceptual views of the reception signal in the case where the first reflection wave R1 returns to the ultrasonic sensor 1 within the reverberation influence time TR. The case where the first reflection wave R1 returns to the ultrasonic sensor 1 within the reverberation influence time TR means the case where the reception signal intensity becomes the intensity threshold $TH_A$ or more due to a reverberation wave R0, and the first reflection wave R1 is received in this state before the reception signal intensity falls below the intensity threshold $TH_A$.

As described above, when reverberation converges and the reception signal intensity falls below the intensity threshold $TH_A$ and then, the reception signal exceeding the intensity threshold $TH_A$ is detected, the controller 14 determines that the reflection wave is received. Therefore, as illustrated in FIG. 4 and FIG. 5, after outputting of the transmission wave, when the first reflection wave R1 is received before the reception signal intensity falls below the intensity threshold $TH_A$, the original first reflection wave R1 cannot be detected.

FIG. 4 illustrates the case where an observed reverberation influence time TRx becomes longer than the predetermined reverberation influence time TR due to the original first reflection wave R1 reflected on the detection object. That the actually-observed reverberation influence time TRx becomes longer than the predetermined reverberation influence time TR due to the reflection wave from the detection object is also expressed as that the reverberation influence time increases, or the reverberation wave R0 is combined with the first reflection wave R1.

FIG. 5 illustrates the case where the original first reflection wave R1 is embedded in the reverberation wave R0. Even in the case where the original first reflection wave R1 is embedded in the reverberation wave R0 as illustrated in FIG. 5, the original first reflection wave R1 is not detected, and the original second reflection wave is observed as the first reflection wave. The case where the original first reflection wave R1 is embedded in the reverberation wave R0 means the case where the original first reflection wave R1 from the detection object converges to a predetermined threshold or less within the reverberation influence time TR.

An upper limit value of the distance within which the original first reflection wave R1 from the detection object converges to the predetermined threshold or less within the reverberation influence time TR is referred to as a closest approach distance. In the present embodiment, the short range threshold Dth1 is the distance within which the ultrasonic wave reciprocates between the ultrasonic sensor 1 and the detection object within the reverberation influence time TR. From another aspect, however, the closest approach distance may be adopted as the short range threshold Dth1. The closest approach distance may be set based on various tests.

Returning to FIG. 3, when the predicted distance De is equal to or smaller than the short range threshold Dth1, YES is selected in Step S120, and the procedure proceeds to Step S130. On the contrary, when the predicted distance De is larger than the short range threshold Dth1, NO is selected in Step S120, and the procedure proceeds to Step S170.

In Step S130, the short range determinator F5 provisionally determines that the detection object is present in the short range area (that is, within the short range threshold Dth1), the procedure proceeds to Step S140. In this stage, the short range determinator F5 does not conclude that the detection object is present in the short range area. Therefore, the processing associated with that the detection object is present in the short range area (for example, notification processing) is not performed. Provisional determination in Step S130 is established in Step S160 through Steps S140 and S150. Step S130 corresponds to provisional determinator.

In Step S140, the short range determinator F5 executes prediction-result adopting determination processing. In the prediction-result adopting determination processing, it is determined whether the provisional determination made in Step S140 is established. The processing serves to reduce the possibility of wrongly determining that the detection object is present in the short range area on the basis of the predicted distance De, irrespective that the detection object is not actually present in the short range area. The prediction-result adopting determination processing will be described below with reference to a flowchart in FIG. 6. Step S140 corresponds to adoption condition determinator.

Figure 6:
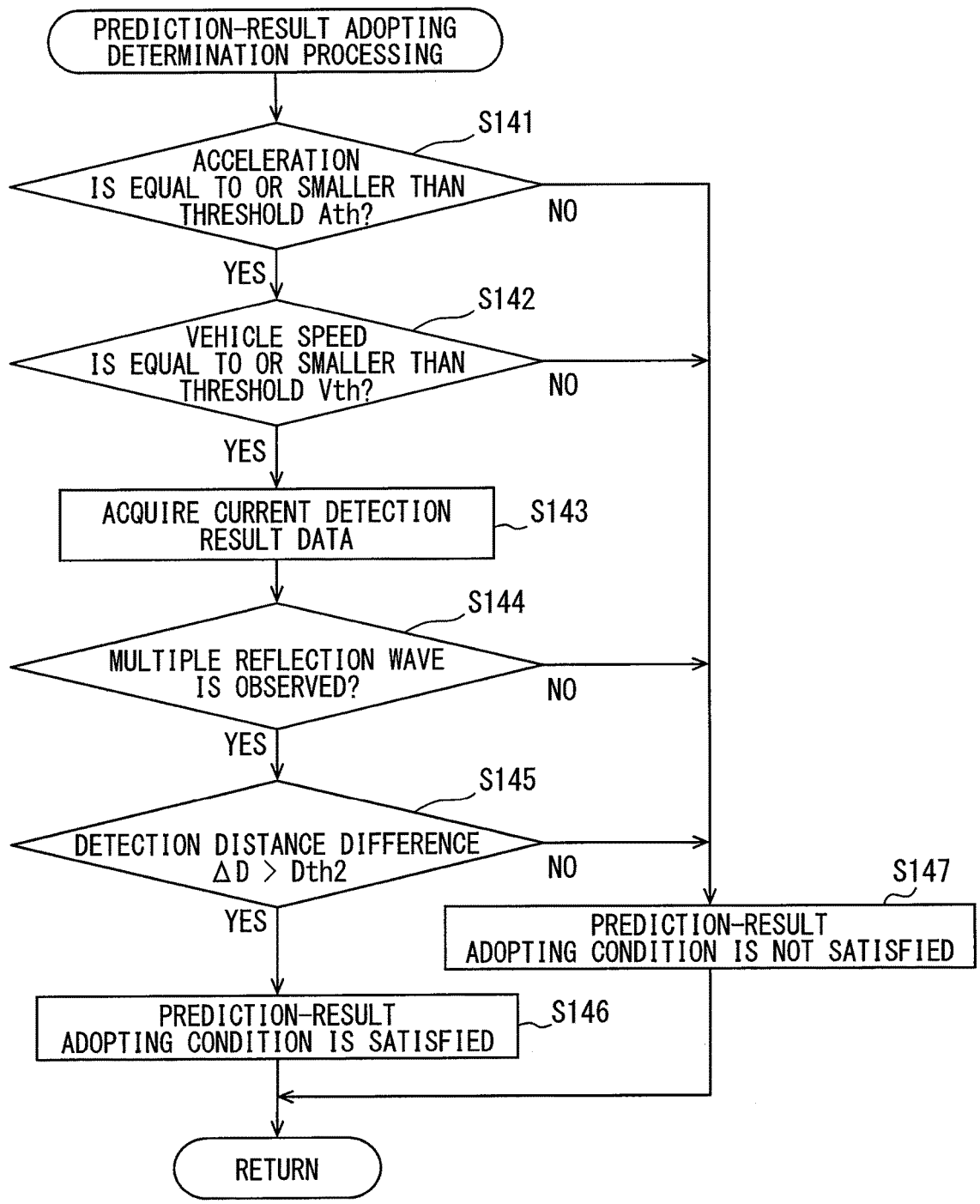
FIG. 6 is a flowchart for describing prediction-result adoption condition determining processing executed by a short range determinator.

In the prediction-result adopting determination processing illustrated in FIG. 6, it is determined whether the current travelling state of the self-vehicle 10 or the detection state of the ultrasonic sensor 1 satisfies a predetermined prediction-result adopting condition. The prediction-result adopting condition is a condition for determining whether the possibility that the detection object is actually present in the short range area is high. When the prediction-result adopting condition is satisfied, the possibility that the detection object is actually present in the short range area is high.

First, in Step S141, it is determined whether the acceleration is equal to or smaller than a predetermined acceleration threshold Ath. When the acceleration is equal to or smaller than the acceleration threshold Ath, YES is selected in Step S141, and the procedure proceeds to Step S142. When the acceleration is larger than the acceleration threshold Ath, NO is selected in Step S141, and the procedure proceeds to Step S147.

The acceleration used herein may be the latest acceleration obtained by the vehicle information acquisition device F1. The acceleration threshold Ath may be designed as appropriate, and is set to 0 herein. Therefore, in the present embodiment, YES is selected in Step S141 when the acceleration is 0 or a negative value (under deceleration).

In Step S142, it is determined whether the vehicle speed is equal to or smaller than a predetermined vehicle speed threshold Vth. When the vehicle speed is equal to or smaller than the vehicle speed threshold Vth, YES is selected in Step S142, and the procedure proceeds to Step S143. When the vehicle speed is larger than the vehicle speed threshold Vth, NO is selected in Step S142, and the procedure proceeds to Step S147.

The vehicle speed described herein may be the latest vehicle speed obtained by the vehicle information acquisition device F1. The vehicle speed threshold Vth may be designed as appropriate, and is set to a value of slowdown level (for example, 10 km/h). When the detection object is present in at least the notification area, the associated processing (notification processing and so on) is executed. Thus, it is likely that the vehicle speed is suppressed to the slowdown level by the driver's operation or automatic vehicle control.

The above-mentioned acceleration threshold Ath is set based on the same concept as the concept of the vehicle speed threshold Vth. That is, given that the detection object is present in the short range area, it is assumed that the vehicle is controlled to decelerate when the vehicle is approaching the detection object present in the travelling direction.

In Step S143, detection result data in the current detection processing is obtained from the ultrasonic sensor 1, and the procedure proceeds to Step S144. The detection result data in the current detection processing refers to detection result data obtained next to the last detection result data used to calculate the predicted distance De.

In Step S144, based in the current detection result data, it is determined whether the first reflection wave contained in detection result data is a multiple reflection wave. The multiple reflection wave is the reflection wave that reciprocates between the ultrasonic sensor 1 and the detection object multiple times and is received.

For example, when the detection object is located in the short range area, as described with reference to FIG. 4 and FIG. 5, the original first reflection wave R1 is combined with or embedded in the reverberation wave R0 and thus, cannot be detected. In place of this, the original first reflection wave R1 is reflected on the ultrasonic sensor 1, and the first reflection wave R1 reflected on the ultrasonic sensor 1 is reflected on the object again, and is detected by the ultrasonic sensor 1.

The ultrasonic wave that reciprocates between the ultrasonic sensor 1 and the detection object twice (referred to as twice-reflection wave) R2 is detected as the first reflection wave in terms of processing. When the detection object is located further than the short range threshold Dth1, the twice-reflection wave may be detected as a second reflection wave or a third reflection wave.

In the present embodiment, whether the first reflection wave is the multiple reflection wave is determined based on the detection distance D. More specifically, when the detection distance D of the first reflection wave is equal to or smaller than twice of the short range threshold Dth1, it is determined that the observed first reflection wave R1 is the twice-reflection wave (that is, multiple reflection wave).

A reason why the detection distance D of the first reflection wave is equal to or smaller than twice of the short range threshold Dth1 is as follows. A largest distance in the case where the original first reflection wave R1 is combined with the reverberation wave R0 is the short range threshold Dth1. In principle, since, unlike the original first reflection wave R1, the twice-reflection wave reciprocates between the ultrasonic sensor 1 and the detection object twice, the detection distance D is twice as much as the detection distance of the original first reflection wave R1. Therefore, when the original first reflection wave R1 is combined with the reverberation wave R0, and the apparent first reflection wave is actually the twice-reflection wave, the detection distance D is equal to or smaller than short range threshold Dth1×2.

From another aspect, when the peak value of the first reflection wave is not saturated, it may be determined that the observed first reflection wave R1 is the twice-reflection wave. The twice-reflection wave propagates with a distance that is twice of the original first reflection wave R1, and is reflected three times to reach the ultrasonic sensor 1. For this reason, the twice-reflection wave is largely attenuated, and the peak value becomes much smaller than the original first reflection wave R1. That is, the case where the peak value of the first reflection wave is not saturated means that the multiple-reflected and attenuated reflection wave is received.

From another aspect, when the detection distance D of the first reflection wave is twice or less of the short range threshold Dth1, and the peak value of the first reflection wave is not saturated, it may be determined that the observed first reflection wave R1 is the twice-reflection wave. Here, a reference value for the peal value, which is used to determine whether the observed first reflection wave is the multiple reflection wave, is the saturated value. However, the reference value is not limited to the saturated value. A threshold (referred to as multiple reflection threshold) for determining whether the observed first reflection wave is the multiple reflection wave may be set for the peak value.

From such an aspect, when the detection distance D of the first reflection wave is smaller than twice of the short range threshold Dth1, and the peak value is smaller than the multiple reflection threshold, it may be determined that the observed first reflection wave is the twice-reflection wave (that is, multiple reflection wave). The multiple reflection threshold may be set to any value that is larger than the intensity threshold $TH_A$ and smaller than the saturated value according to tests.

The case where the observed first reflection wave is the twice-reflection wave has been described above. However, also a reflection wave that reciprocates between the ultrasonic sensor 1 and the detection object three times or more may be determined to be the multiple reflection wave according to the above-mentioned condition.

When it is determined that the first reflection wave is the multiple reflection wave in Step S144, YES is selected in Step S144, and the procedure proceeds to Step S145. When it is determined that the first reflection wave is not the multiple reflection wave, NO is selected in Step S144, and the procedure proceeds to Step S147.

In Step S145, it is determined that a detection distance difference ΔD is equal to or larger than a predetermined distance difference threshold Dth2. The detection distance difference ΔD is a value found by subtracting the last detection distance D from the current detection distance D.

In the case where both of the first reflection wave observed in the last detection processing and the first reflection wave observed in the current detection processing are the original first reflection wave R1, the self-vehicle 10 advances toward the detection object. Accordingly, the current detection distance D becomes smaller than the last detection distance D. That is, while the original first reflection wave R1 can be detected, the detection distance difference ΔD has a negative value.

When the first reflection wave observed in the current detection processing is the twice-reflection wave, the detection distance D is twice as much as the detection distance of the original first reflection wave R1. Therefore, in the case where the original first reflection wave R1 is detected immediately before the first reflection wave R1 is combined with the reverberation wave R0 in the last detection processing, and the twice-reflection wave is detected as the first reflected in the current detection processing, the current detection distance D becomes longer than the last detection distance D.

That is, the case where the detection distance difference ΔD is equal to or larger than the distance difference threshold Dth2 means the case where the twice-reflection wave is detected as the first reflection wave. The distance difference threshold Dth2 may be designed according to tests, and set to any value of about 4 cm to 10 cm, for example. According to the determination condition, this applies to even the case where the original first reflection wave R1 is combined with or embedded in the reverberation wave R0, and the observed first reflection wave is a reflection wave from another detection object that is the second closest to the ultrasonic sensor 1. Such a case also implies that the detection object corresponding to the original first reflection wave R1 is present in the short range area, increasing the plausibility of provisional determination in Step S130.

When the detection distance difference ΔD is equal to or larger than the predetermined distance difference threshold Dth2, YES is selected in Step S145, and the procedure proceeds to Step S146. When the detection distance difference ΔD is smaller than the predetermined distance difference threshold Dth2, NO is selected in Step S145, and the procedure proceeds to Step S147.

In Step S146, it is determined that the prediction-result adopting condition is satisfied. Then, the determination result is held as the internal state, and the procedure returns to Step S150 in the short range determination processing illustrated in FIG. 3. In Step S147, it is determined that the prediction-result adopting condition is not satisfied. Then, the determination result is held as the internal state, and the procedure returns to a caller of the prediction-result adopting determination processing (Step S150).

Returning to FIG. 3, Step S150 and subsequent steps in the short range determination processing will be described below. In the above prediction-result adopting determination processing, when it is determined that the prediction-result adopting condition is satisfied, YES is selected in Step S150, and the procedure proceeds to Step S160. When it is determined that the prediction-result adopting condition is not satisfied, NO is selected in Step S150, and the procedure proceeds to Step S170.

In Step S160, the short range determinator F5 establishes the provisional determination in Step S130. That is, it is determined that the detection object is present in the short range area, and this flow is terminated. Based on the determination in Step S160, the peripheral monitoring ECU 2 executes the notification processing and so on.

Step S170 is exceptional processing, and contents of the processing may be designed as appropriate. For example, in Step S170, the detection distance D detected (to be detected) in detection processing to be predicted is adopted as it is. In other words, processing in Step S100 to Step S160 determines that the detection object is present in the short range area on the basis of a predicted value calculated from a last actually-measured value, rather than the actually-measured value detected by the ultrasonic sensor 1.

Effects of Embodiment

When the detection object is present within the short range threshold Dth1 from the ultrasonic sensor 1 (that is, short range area), as illustrated in FIG. 4 and FIG. 5, the first reflection wave R1 may be combined with or embedded in the reverberation wave R0, and be observed as one waveform. In such a case, the ultrasonic sensor 1 cannot detect that the detection object is present in the short range area. Further, the multiple reflection wave from the detection object may be detected as the first reflection wave to calculate a wrong distance.

To address such difficulties, with the configuration in the present embodiment, based on the detection distance D obtained in the last detection processing and the movement distance of the self-vehicle 10, a distance detected in next detection processing (predicted distance De) is predicted. Then, it is determined whether the predicted distance De is equal to or smaller than the short range threshold Dth1, and based on the determination result, it is determined whether the detection object is present in the short range area.

Therefore, with the configuration in the present embodiment, even when the detection object is present within the short range threshold Dth1 from the ultrasonic sensor 1 (that is, short range area), it can be determined that the detection object is present in the short range area.

In the present embodiment, when the predicted distance De is equal to or smaller than the short range threshold Dth1, it is provisionally determined that the detection object is present in the short range area (Step S130), and the prediction-result adopting determination processing is executed (Step S140). Then, when it is determined that the prediction-result adopting condition is satisfied in the prediction-result adopting determination processing, the provisional determination is established.

Since the prediction-result adopting condition is the condition suggesting that the detection object is present in the short range area, the case of satisfying the prediction-result adopting condition means that the possibility that the detection object is actually present in the short range area is high. Therefore, with the above-mentioned configuration, it can be determined that the detection object is present in the short range area more accurately.

In Patent Literature 1, it is detected that the detection object is present within the short range threshold Dth1 whether the observed reverberation influence time TRx is longer than the original reverberation influence time TR, that is, whether the observed reverberation influence time TRx increases.

In the case where the vehicle speed is relatively low, and the movement of the vehicle on the detection cycle is so small with respect to the short range threshold Dth1 or a pulse width of the first reflection wave R1, the detection processing can be executed at a timing when the first reflection wave R1 is combined with the reverberation wave R0 while the vehicle approaches the detection object. In such a case, since an increase in the reverberation influence time can be detected, also in Patent Literature 1, it is determined that the detection object is present in the short range area.

Once an increase in the reverberation influence time is detected, the detection result that the detection object is present in the short range area for a certain time. With this configuration, even when the original first reflection wave R1 is embedded in the reverberation wave R0 (FIG. 5), it can be determined that the detection object is present in the short range area.

Figure 7:
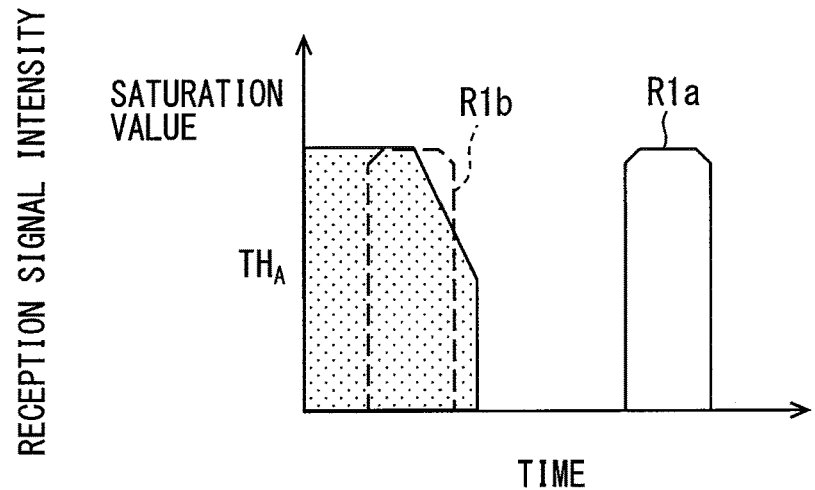
FIG. 7 is a view for describing effects of the present embodiment.

However, in the case where the movement distance on the detection cycle is large with respect to the short range threshold Dth1 or the pulse width of the first reflection wave R1, an increase in the reverberation influence time, which is caused by combination of the first reflection wave R1 and the reverberation wave R0, may not be detected. That is, the detection processing may not be executed at the timing when the first reflection wave R1 is combined with the reverberation wave R0 while the vehicle approaches the detection object. R1a illustrated in FIG. 7 represents the first reflection wave received in the last detection processing, and R1b represents the original first reflection wave received in next detection processing.

In such a case, since an increase in the reverberation influence time is not detected, according to the technique disclosed in Patent Literature 1, it cannot be detected that the detection object is present in the short range area.

On the contrary, with the present embodiment configuration, in determining whether the detection object is present in the short range area, an increase in the reverberation influence time need not be detected. For this reason, even when the movement distance on the detection cycle is large with respect to the short range threshold Dth1 or the pulse width of the first reflection wave R1, it can be determined that the detection object is present in the short range area. Then, the notification processing can be executed according to the determination result.

Although one embodiment of the present disclosure has been described above, the present disclosure is not limited to the embodiment. Following modifications fall within the technical scope of the present disclosure, and the present disclosure can be modified in any manner so as not to deviate from the subject matter of the present disclosure.

Modification 1

In the above-mentioned embodiment, when the predicted distance De is equal to or smaller than the short range threshold Dth1, it is provisionally determined that the detection object is present in the short range area (Step S130) and then, the provisional determination is established in Step S160. The present invention is not limited to this case. That is, in Step S130, it may be determined that the detection object is present in the short range area.

Modification 2

The prediction-result adopting condition may be designed as appropriate. For example, in the above-described embodiment, as the prediction-result adopting condition, the acceleration is equal to or smaller than the predetermined acceleration threshold Ath. However, the prediction-result adopting condition is not limited to this case. That is, Step S141 may be omitted.

In the above-described embodiment, as the prediction-result adopting condition, the vehicle speed is equal to or smaller than the predetermined vehicle speed threshold Vth.

However, the prediction-result adopting condition is not limited to this. That is, Step S142 may be omitted.

In the above-described embodiment, as the prediction-result adopting condition, the observed first reflection wave is the multiple reflection wave. However, the prediction-result adopting condition is not limited to this case. That is, Step S144 may be omitted.

In the above-described embodiment, as the prediction-result adopting condition, the detection distance difference ΔD is equal to or larger than the distance difference threshold Dth2. However, the prediction-result adopting condition is not limited to this case. That is, Step S145 may be omitted.

Any condition other than the above-mentioned conditions may be set as the prediction-result adopting condition. For example, in the case where the detection object is present in some short range area, also when the original first reflection wave R1 can be detected, it is expected that the twice-reflection wave is detected as a second reflection wave (or a third reflection wave).

That is, the case where the multiple reflection wave corresponding to the first reflection wave R1 is detected in the last detection processing means that the detection object is present in some short range area. Therefore, that the multiple reflection wave corresponding to the first reflection wave R1 is detected in the last detection processing may be added as the prediction-result adopting condition. Whether the second reflection wave or the third reflection wave is the multiple reflection wave corresponding to the first reflection wave R1 may be determined based on whether the detection distance is an integral multiple of the detection distance D of the first reflection wave R1. As a matter of course, since the detection distance corresponds to TOF in a one-to-one relationship, TOF may be used in place of the detection distance. In the above-mentioned embodiment, the parameter related to the detection distance may be replaced with a parameter in units of time, for example, TOF.

Modification 3

In the above-mentioned embodiment, assuming that the detection object is a static object, the predicted distance De is calculated. However, the detection object may be a mobile body. When the detection object is a mobile body, only using the vehicle speed of the self-vehicle 10 makes an error contained in the predicted distance De larger. An aspect illustrated below can apply to the case where the detection object is a mobile body. For convenience, the detection object is hereinafter defined as the mobile body that moves in the same direction as the travelling direction of the self-vehicle 10.

Figure 8:
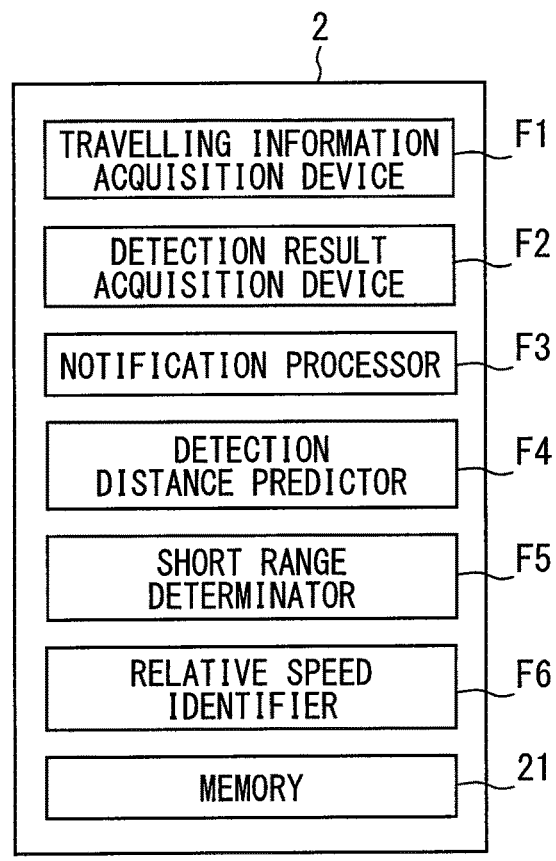
FIG. 8 is a block diagram schematically illustrating configuration of the peripheral monitoring ECU of a modification 3.

A peripheral monitoring ECU 2 in Modification 3 includes a relative speed identifier F6 for identifying the relative speed of the self-vehicle 10 to the detection object (see FIG. 8). The relative speed of the self-vehicle 10 to the detection object is a value obtained by subtracting the moving speed of the detection object from the vehicle speed of the self-vehicle 10, the travelling direction of the self-vehicle 10 being positive. Therefore, when the detection object is a static object, the relative speed corresponds to the vehicle speed of the self-vehicle 10.

The relative speed identifier F6 can identify the relative speed according to a well-known method. For example, the relative speed identifier F6 may calculate the relative speed on the basis of a change of the detection distance D with time with respect to the detection object. Specifically, the relative speed may be obtained by dividing a value found by subtracting the last detection distance D from the detection distance D two times earlier by the detection cycle.

For example, the relative speed identifier F6 may find the relative speed by using a frequency fs of the transmission wave, a frequency fr of the first reflection wave R1, a sound speed V, and a vehicle speed Vs of the self-vehicle 10 according to a formula of the well-known Doppler effect. That is, given that the moving speed of the detection object is Vd, the relative speed Vs−Vd can be found according to (fr−fs)×(V−Vs)/fs. The frequency fs of the transmission wave may be a predetermined value, and the frequency fr of the first reflection wave R1 may be detected by the ultrasonic sensor 1.

The detection distance predictor F4 can find the predicted distance De by using the relative speed obtained by the relative speed identifier F6 in place of the vehicle speed of the self-vehicle 10 in Step S110. The predicted distance De is a distance found in consideration of the moving distance of the detection object on the detection cycle.

Therefore, with the configuration in Modification 3, when the detection object is a mobile body, the effect of the embodiment can be achieved.

Modification 4

In the above-mentioned embodiment, the ultrasonic sensor 1 forming the detection area in the travelling direction of the self-vehicle 10 is subjected to the short range determination processing. That is, the ultrasonic sensor 1 forming the detection area in front of the self-vehicle 10, or the ultrasonic sensor 1 forming the detection area in the rear of the self-vehicle 10 is processed. However, the present invention is not limited to this case.

When the self-vehicle 10 turns, the ultrasonic sensor 1 forming the detection area diagonally to the front of the self-vehicle 10 or diagonally to the rear of the self-vehicle 10 may correspond to the ultrasonic sensor 1 forming the detection area in the travelling direction of the self-vehicle 10.

The ultrasonic sensor 1 for detecting the object present diagonally to the front of the self-vehicle 10 may be arranged at each of right and left corners of a front bumper, for example. The ultrasonic sensor 1 for detecting the object present diagonally to the rear of the self-vehicle 10 may be provided at each of right and left corners of a rear bumper, for example.

Modification 5

In the case where it is determined that the detection object is present in the short range area on the basis of the predicted distance De, when the predicted distance De is smaller than the closest approach distance, or an increase in the reverberation influence time is small, it may be determined that the detection object is present in a closest approach area. The closest approach area described herein refers to such an area in the short range area that the original first reflection wave R1 is embedded in the reverberation wave R0.

As apparent from FIG. 4 and FIG. 5, the distance between the detection object and the ultrasonic sensor 1 is smaller in the state where the original first reflection wave R1 is combined with the reverberation wave R0 than the state where the original first reflection wave R1 is embedded in the reverberation wave R0. That is, when the distance to the detection object is equal to or smaller than the closest approach distance, more attention needs to be given to the detection object.

Thus, when it is determined that the detection is located in the closest approach area in the short range area as in Modification 5, the determination result can be reflected on a change in notification in the notification processing. For example, when it is determined that the detection object is present in the closest approach area, the notification apparatus 3 may appeal that the distance between the detection object and the ultrasonic sensor 1 is small to the driver more strongly. In the case where the peripheral monitoring ECU 2 has a function to control travelling of the self-vehicle 10, control such as an increase in a braking force may be performed based on determination of whether the detection object is present in the closest approach area.

Here, each flowchart or processing in each flowchart in this application is configured of a plurality of sections (or referred to as steps), and each section is expressed as, for example, S100. Further, each section can be divided into a plurality of subsections. A plurality of sections also may be combined into one section. Each section thus configured may be referred as device, module, or means.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An ultrasonic type object detection apparatus used in a vehicle for sequentially detecting a distance between an ultrasonic sensor and an object in a coverage of a transmission wave at a predetermined detection cycle, based on a time taken for the ultrasonic sensor to transmit the transmission wave and then to receive a reflection wave of the transmission wave, the apparatus comprising:
   a storage that stores the detected distance between the object and the ultrasonic sensor;
   a vehicle information acquisition device that acquires vehicle information for calculating a movement distance of the vehicle, the movement distance comprising a distance predicted to be traveled by the vehicle between a previous detection to a next detection, the movement distance calculated based on previous detection;
   a detection distance predictor that calculates a predicted distance between the ultrasonic sensor and the object at the next detection by subtracting the movement distance from a last detection distance; and
   a short range determinator that determines whether the object is present in a short range area in which the distance between the object and the ultrasonic sensor is equal to or less than a short range threshold, based on whether the predicted distance is equal to or less than the short range threshold,
   wherein:
   the object is present in a travelling direction of the vehicle;
   the short range threshold is an upper limit value of the distance within which the reflection wave from the object returns while the transmission wave is being reverberated in the ultrasonic sensor;
   the predicted distance is a distance predicted by the detection distance predictor; and the short range determinator includes
a provisional determinator that provisionally determines that the object is present in the short range area, in response to the predicted distance being equal to or less than the short range threshold, and
an adoption condition determinator that determines whether a prediction-result adopting condition is satisfied, the prediction-result adopting condition is a predetermined condition for determining whether the object is actually present in the short range area, the prediction-result adopting condition including
(i) a condition in which a detected distance of the reflection wave is smaller than twice of the short range threshold, and
(ii) a condition in which a detection distance difference is greater than a predetermined distance difference threshold, the detection distance difference being obtained by subtracting a previous detected distance in the previous detection from a current detected distance in a current detection of the distance between the ultrasonic sensor and the object; and
the short range determinator determines that the object is present in the short range area, in response to the provisional determinator provisionally determining that the object is present in the short range area and the adoption condition determinator determining that the prediction-result adopting condition is satisfied.

2. The ultrasonic type object detection apparatus according to claim 1,
wherein the prediction-result adopting condition includes a condition in which the reflection wave, which is initially detected for the transmission wave transmitted in a situation where the provisional determinator provisionally determines the object being present in the short range area, is a multiple reflection wave reciprocating between the object and the ultrasonic sensor multiple times.

3. The ultrasonic type object detection apparatus according to claim 1,
wherein the short range determinator determines that the object is present in the short range area, in response to the predicted distance being equal to or less than the short range threshold.

4. The ultrasonic type object detection apparatus according to claim 1, further comprising:
a relative speed identifier that identifies relative speed of the vehicle with respect to the object,
wherein the object is a mobile body, and moves in a direction which is identical to a travelling direction of the vehicle;
wherein the short range threshold is an upper limit value of the distance within which the reflection wave from the object returns while the transmission wave is being reverberated in the ultrasonic sensor;
wherein the predicted distance between the ultrasonic sensor and the object in the next detection is a distance predicted by the detection distance predictor; and
wherein the detection distance predictor calculates the predicted distance between the ultrasonic sensor and the object in the next detection by using the relative speed identified by the relative speed identifier.

5. The ultrasonic type object detection apparatus according to claim 1,
wherein the prediction-result adopting condition includes a condition in which an acceleration of the vehicle is smaller than or equal to a threshold acceleration.

6. The ultrasonic type object detection apparatus according to claim 1,
wherein satisfying of the prediction-result adopting condition determines that the object is actually present in the short range area based on the vehicle information.

7. The ultrasonic type object detection apparatus according to claim 1,
wherein satisfying of the prediction-result adopting condition determines that the object is actually present in the short range area based on a comparison with a threshold of a difference between a detected distance of a current cycle and a detected distance of a previous cycle.

8. The ultrasonic type object detection apparatus according to claim 1, further comprising:
an ultrasonic sensor that generates reverberation caused by the transmission wave after the ultrasonic sensor transmits the transmission wave.

9. The ultrasonic type object detection apparatus according to claim 1,
wherein the storage further stores the short range threshold.

10. An ultrasonic type object detection apparatus used in a vehicle for sequentially detecting a distance between an ultrasonic sensor and an object in a coverage of a transmission wave at a predetermined detection cycle, based on a time taken for the ultrasonic sensor to transmit the transmission wave and then to receive a reflection wave of the transmission wave, the apparatus comprising:
a storage that stores the detected distance between the object and the ultrasonic sensor;
a vehicle information acquisition device that acquires vehicle information for calculating a movement distance of the vehicle, the movement distance comprising a distance predicted to be traveled by the vehicle between a previous detection to a next detection, the movement distance calculated based on the previous detection;
a detection distance predictor that calculates a predicted distance between the ultrasonic sensor and the object at the next detection by subtracting the movement distance from a last detection distance; and
a short range determinator that determines whether the object is present in a short range area in which the distance between the object and the ultrasonic sensor is equal to or less than a short range threshold, based on whether the predicted distance is equal to or less than the short range threshold,
wherein:
the short range threshold is an upper limit value of the distance within which the reflection wave from the object returns while the transmission wave is being reverberated in the ultrasonic sensor;
the predicted distance is a distance predicted by the detection distance predictor;
the short range threshold is decided based on a value obtained by multiplying a sound speed by a reverberation influence time, and then dividing by two;
the reverberation influence time is a sum of an output time of the transmission wave and a reverberation converge time;
the reverberation converge time is subsequent to the output time of the transmission wave; and
the reverberation converge time is a time required for a signal intensity of reverberation caused by the transmission wave to reach below a predetermined intensity threshold.

11. The ultrasonic type object detection apparatus according to claim 10, wherein:
   the short range determinator determines that the distance between the object and the ultrasonic sensor is equal to or less than a closest approach distance, in response to the predicted distance being equal to or less than the closest approach distance; and
   the closest approach distance is an upper limit value of a distance within which the reflection wave converges to the intensity threshold or less within the reverberation influence time.

\* \* \* \* \*